(No Model.)

R. McNEILL.
SUPPORT FOR PHOTOGRAPHIC FILMS.

No. 406,460. Patented July 9, 1889.

WITNESSES:
E. J. Griswold.
Geo. A. Crane.

INVENTOR
Ralph McNeill
BY
Howson and Howson
his ATTORNEYS

UNITED STATES PATENT OFFICE.

RALPH McNEILL, OF NEW YORK, N. Y.

SUPPORT FOR PHOTOGRAPHIC FILMS.

SPECIFICATION forming part of Letters Patent No. 406,460, dated July 9, 1889.

Application filed July 13, 1888. Serial No. 279,856. (No model.)

*To all whom it may concern:*

Be it known that I, RALPH MCNEILL, a citizen of the United States, and a resident of New York city, New York, have invented an Improved Support for Photographic Films, of which the following is a specification.

The main object of my invention is to provide a light but rigid substitute for the glass plates or paper used as backings or supports for photographic films. The glass plates while answering the purpose reasonably well are yet open to the practical objection, especially for amateur and outdoor work, that they are heavy and bulky for purposes of transportation. Paper as a substitute has been proposed and tried, but for many purposes it will not answer well. I use as a substitute for glass and paper an open mat or frame of the desired size, and I mount the photographic film upon this open mat or frame by affixing the film to it at its margin, as hereinafter described.

Figure 1:
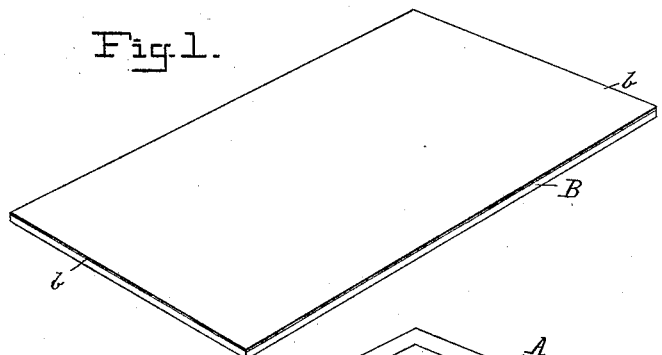
Figure 2:
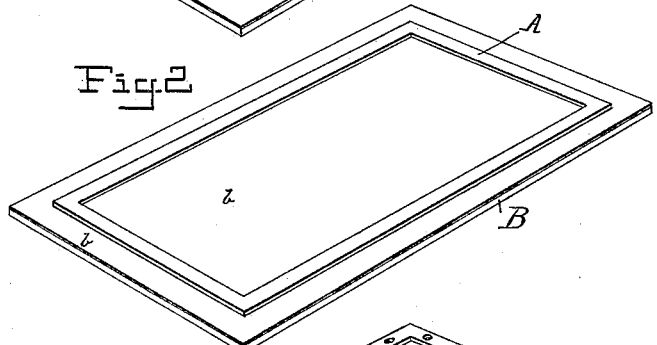
Figure 3:
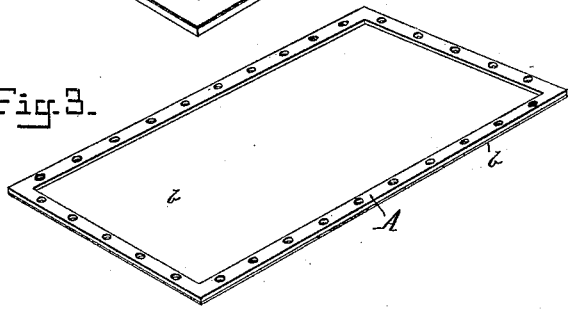
Figure 4:
Figure 5:
Figure 6:
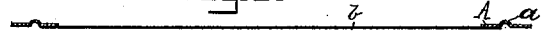

In the accompanying drawings, Figure 1 is a view of a photographic film on glass. Fig. 2 is a view showing the manner of affixing the film to my improved support. Fig. 3 is a view of the mounted film. Fig. 4 is a transverse section, and Figs. 5 and 6 are transverse sections of modifications.

In practically carrying out my invention the emulsion to form the film is first flowed upon a glass plate or other smooth surface B, Fig. 1, and my frame or support A is by preference affixed to the film *b* while the latter is still on the glass or other surface. The film *b* and frame or support are then by suitable means stripped from the glass plate or other surface, and the film thus permanently adherent to the mat is then ready to be exposed to make a negative or positive. In practice I prefer to use a glass plate B, Fig. 1, on which to flow the film, and to combine with the sensitive film a stratum or film of gelatine or other suitably tough transparent material adhering to the sensitive film. In the first instance the glass plate of suitable size is thoroughly cleaned with acid and dried, and may be rubbed with a mixture of talc and alcohol, after which it is buffed off and polished. The plate may then be coated around the edges with india-rubber, varnish, or similar material, which will prevent the gelatine or other film or stratum from peeling off; but this is not essential. I then flow the plate with a solution of gelatine containing chrome alum, potassium bichromate, or zinc sulphate to render it insoluble when set. A small percentage of glycerine may be added to keep this strengthening-film from wrinkling. When this has set and dried, it is coated with an emulsion containing sensitive material, such as used in making ordinary dry-plates for photographic use, Fig. 1. When this is dry, the film is ready to be mounted upon my improved support. This mounting I prefer to effect in the following way: The open mat or frame A, Fig. 2, of the desired size and of flat metal or other suitably-rigid material, is cemented to the film on the glass with an insoluble cement, (say equal parts of gutta-percha, shellac, and pitch used warm.) When set, the film around the outer margin of the frame is preferably cut through to the glass by a suitable instrument, and the film and adhering mat are then stripped from the plate by passing a thread under the film. The mounted film, Fig. 3, is now ready for exposure in the camera or printing-frame, and may be developed, fixed, and dried in any usual way.

Although I have illustrated the emulsion as flowed over a plate of a size sufficient only for one of the mats or frames, it will be understood that the emulsion may be flowed over a plate sufficiently large to furnish films for several frames or mats.

The strengthening-film of gelatine may be on either side of the sensitive film—that is, the sensitized emulsion may be flowed over the glass plate first before the gelatine, if desired. The strengthening-film may also be entirely dispensed with if the sensitized film is made sufficiently thick and tough. The mats or frames A may be simply stamped out of sheet metal and japanned or varnished. If additional stiffness is desired, the metal may be crimped, so as to form a rib *a* thereon, as shown in Fig. 6, or the edges may be bent or flanged, as indicated in Fig. 5. In either case this will not materially increase the bulk of a package of the films, as the frames will fit into each other like pans. If preferred, the mats may be perforated, as indicated in Fig.

3, in order that the mat may adhere more firmly to the film.

My invention may also be used for films which have already been exposed. A process now in use employs paper as a support for the sensitive film, which is insoluble. After the negative has been made it is placed in hot water, which releases the film, carrying the image from the paper backing. In the common process the film is then mounted upon the glass; but that is an extremely difficult operation.

By my invention my improved open frame or mat may be cemented to the film on the paper, and then the hot water may be applied to free the paper, leaving the film supported on the mat, after which it may be dried and printed from, as usual.

I claim as my invention—

1. As a new article of manufacture, the herein-described substitute for paper of plate-mounts for photographic films, and consisting of an open frame or mat with a photographic film permanently adherent at its margin to the said frame or mat.

2. As a new article of manufacture, an open frame or mat having a photographic film cemented to it around its margin.

3. As a new article of manufacture, an open frame or mat carrying a sensitized photographic film with a strengthening film or stratum adhering to the sensitized film.

In testimony whereof I have signed my name to this specification in the presence of two subscribing witnesses.

RALPH McNEILL.

Witnesses:
 GEO. A. CRANE,
 HUBERT HOWSON.